(12) United States Patent
Gupta et al.

(10) Patent No.: US 10,977,767 B2
(45) Date of Patent: Apr. 13, 2021

(54) PROPAGATION OF SPOT HEALING EDITS FROM ONE IMAGE TO MULTIPLE IMAGES

(71) Applicant: Adobe Inc., San Jose, CA (US)

(72) Inventors: Subham Gupta, Roorkee (IN); Nitish Singla, Bathinda (IN)

(73) Assignee: ADOBE INC., San Jose, CA (US)

(*) Notice: Subject to any disclaimer, the term of this patent is extended or adjusted under 35 U.S.C. 154(b) by 254 days.

(21) Appl. No.: 16/202,916

(22) Filed: Nov. 28, 2018

(65) Prior Publication Data

US 2020/0167893 A1 May 28, 2020

(51) Int. Cl.
*G06T 3/00* (2006.01)
*G06T 11/60* (2006.01)
*G06K 9/00* (2006.01)
*G06T 5/20* (2006.01)

(52) U.S. Cl.
CPC ........ *G06T 3/0075* (2013.01); *G06K 9/00228* (2013.01); *G06K 9/00248* (2013.01); *G06K 9/00268* (2013.01); *G06K 9/00288* (2013.01); *G06T 5/20* (2013.01); *G06T 11/60* (2013.01); *G06T 2207/20212* (2013.01)

(58) Field of Classification Search
None
See application file for complete search history.

(56) References Cited

U.S. PATENT DOCUMENTS 9,524,540 B2  12/2016  Edwin et al.
9,900,503 B1   2/2018  Bedi et al.
2010/0026831 A1* 2/2010 Ciuc .............. G06K 9/00221 348/222.1
2013/0129158 A1  5/2013  Wang et al.
2013/0279809 A1* 10/2013 Dellinger ........... G06K 9/00255 382/195
2015/0009277 A1*  1/2015  Kuster .............. G06T 5/50 348/14.07

(Continued)

OTHER PUBLICATIONS

"Retouch and repair photos", downloaded from https://helpx.adobe.com/photoshop/using/retouching-repairing-images.html#retouch_with_the_spot_healing_brush_tool, Dec. 6, 2017, 19 pages.

(Continued)

*Primary Examiner* — Kim Y Vu
*Assistant Examiner* — Nathan J Bloom
(74) *Attorney, Agent, or Firm* — F. Chau & Associates, LLC

(57) ABSTRACT

Systems and techniques for propagating spot healing edits from a source image to a target image include receiving a source image depicting a face with a healing region and a target image depicting the face. The face is detected in the source image including detecting facial feature points in the source image. The face is identified in the target image including detecting facial feature points in the target image. Facial feature point correspondence is determined between the facial feature points of the source image in the facial feature points of the target image. Region correspondence is determined between regions of the source image and regions of the target image using the facial feature point correspondence. The healing region of the face in the source image is transformed to a corresponding region of the face in the target image using the region correspondence.

19 Claims, 10 Drawing Sheets

(56) References Cited

U.S. PATENT DOCUMENTS

| | | | |
|---|---|---|---|
| 2015/0117786 A1* | 4/2015 | James | G06F 16/51 |
| | | | 382/195 |
| 2015/0178965 A1 | 6/2015 | Edwin et al. | |
| 2017/0228453 A1 | 8/2017 | Gupta et al. | |
| 2018/0005448 A1* | 1/2018 | Choukroun | G06T 5/005 |
| 2018/0053103 A1* | 2/2018 | Delgado | G06N 5/04 |
| 2018/0144212 A1* | 5/2018 | Burgos | G06K 9/00315 |
| 2018/0204097 A1 | 7/2018 | Karki et al. | |
| 2019/0251674 A1* | 8/2019 | Chang | G06N 3/08 |

OTHER PUBLICATIONS

Dalal, Navneet, et al., "Histograms of Oriented Gradients for Human Detection", In Computer Vision and Pattern Recognition, IEEE Computer Society Conference on Jun. 25, 2008, 8 pages.
Kazemi, Vahid, et al., "One Millisecond Face Alignment with an Ensemble of Regression Trees", Proceedings of the IEEE Conference on Computer Vision and Pattern Recognition, 2014, 8 pages.
Lee, D. T., et al., "Two Algorithms for Constructing a Delaunay Triangulation", International Journal of Computer and Information Sciences, vol. 9, No. 3, Feb. 1980, pp. 219-242.

* cited by examiner

PROPAGATION OF SPOT HEALING EDITS FROM ONE IMAGE TO MULTIPLE IMAGES

TECHNICAL FIELD

This description relates to the propagation of spot healing edits from one image to one or more other images.

BACKGROUND

Photographers often find it very time consuming to apply the same set of edits on multiple images. Imagine a photographer capturing a large number of photographs at a party. At such an event, there will be a series of photographs in which every single photograph will contain largely the same group of people. Editing each one of these photographs independently would be very tedious and unproductive for the photographer.

To speed up this workflow of editing a series of photographs, current photo editing software products provide the ability to transfer the edits from one photograph to several other photographs. Users can edit just one image and then propagate the changes to the rest of making them look consistent and saving the time of manually duplicating edits to multiple similar images.

Though the workflow is powerful and helpful for the photographers, this workflow does not solve the problem entirely. Current implementations and techniques of these photo editing software products for transferring edits may work for regular edits like exposure and white balance, but they do not work well for transferring spot corrections, especially when it comes to healing facial imperfections.

In spot healing, the selection of the source patch and the target patch is driven by the image content and is highly likely to change across images. For example, a person's face may change its position. The face posture and expressions are also likely to vary across images. Therefore, existing techniques that simply use the same image region for applying spot corrections for source and target images can produce undesirable results. Similarly, techniques that allow a copy and paste of the spot healing changes from one image to another do not take into account the change of content across the images and therefore does not provide good or desirable results.

It is technically challenging to propagate the spot healing of an object in a source image to the same object in multiple target images, especially when the object in the multiple target images is different in one way or another from the object in the source image. For example, the object in the target images may be offset or angled or at a different distance from the object in the source image even though it is the same object in the source image and the target images. The change in orientation or rotation of the object in the target images presents technical challenges when attempting to propagate edits made to the object in the source image.

What is desired is a technical solution that will enable spot healing edits to be transferred from one image to multiple other images in a manner that provides desirable results across the images.

SUMMARY

This document describes a system and techniques for propagating spot healing edits from a source image to one or more target images. The system and techniques provide a technical solution to the technical challenges described above, namely how to propagate a spot healing edit on an object in an image to the same object in one or more other images. The system and techniques described in this document use the information for spot healing already applied in a given source image to accurately determine the equivalent spot healing parameters for a set of target images on which similar spot healing fixes are to be applied. The technical solution accurately maps the source and target regions of the healing patches from the source image to the one or more target images.

According to one general aspect, systems and techniques for propagating spot healing edits from a source image to a target image includes receiving a source image depicting a face with a healing region and a target image depicting the face. The face is detected in the source image including detecting facial feature points in the source image. The face is identified in the target image including detecting facial feature points in the target image. Facial feature point correspondence is determined between the facial feature points of the source image and the facial feature points of the target image. Region correspondence is determined between regions of the source image and regions of the target image using the facial feature point correspondence. The healing region of the face in the source image is transformed to a corresponding region of the face in the target image using the region correspondence.

Implementations may include one or more of the following features. For example, the healing region may include a source patch and a target patch. Detecting the face in the source image may include using a face detector unit including a histograms of oriented gradients features combined with a pre-trained linear classifier to detect facial boundaries in the source image. Detecting the facial feature points in the source image may include estimating a location of multiple coordinates that map to facial structures on the face in the source image. A local binary pattern combined with the histograms of oriented gradients features may be used to detect facial boundaries of the face in the target image. Detecting the facial feature points in the target image may include estimating a location of multiple coordinates that map to facial structures on the face in the target image.

The region correspondence may be determined by performing a Delaunay triangulation on the facial feature points of the source image to generate a set of triangles in the source image and performing the Delaunay triangulation on the facial feature points of the target image to generate a set of triangles in the target image. Transforming the healing region of the face in the source image to a corresponding region of the face in the target image may include identifying one or more triangles from the set of triangles in the source image that contain the healing region, calculating affine transforms for the triangles that contain the healing regions, determining a bounding rectangle for the healing region and generating multiple small square regions from the bounding rectangle. For each of the multiple small square regions, the healing region is mapped to the target image using the affine transform of the triangle in which the small square region is enclosed.

In another general aspect, systems and techniques for propagating spot healing edits from a source image to multiple target images include receiving a source image depicting a face with a healing region, where the healing region includes a source patch and a target patch. Multiple target images that depict the face are received. A corresponding source patch and a corresponding target patch are identified in each of the multiple target images. The source patch and the target patch of the face in the source image are transformed to the corresponding source patch and the corresponding target patch of the face in each of the multiple target images. Implementations include the features described above with respect to the first general aspect, as well as features described in more detail below.

The details of one or more implementations are set forth in the accompanying drawings and the description below. Other features will be apparent from the description and drawings, and from the claims.

DETAILED DESCRIPTION

Figure 1:
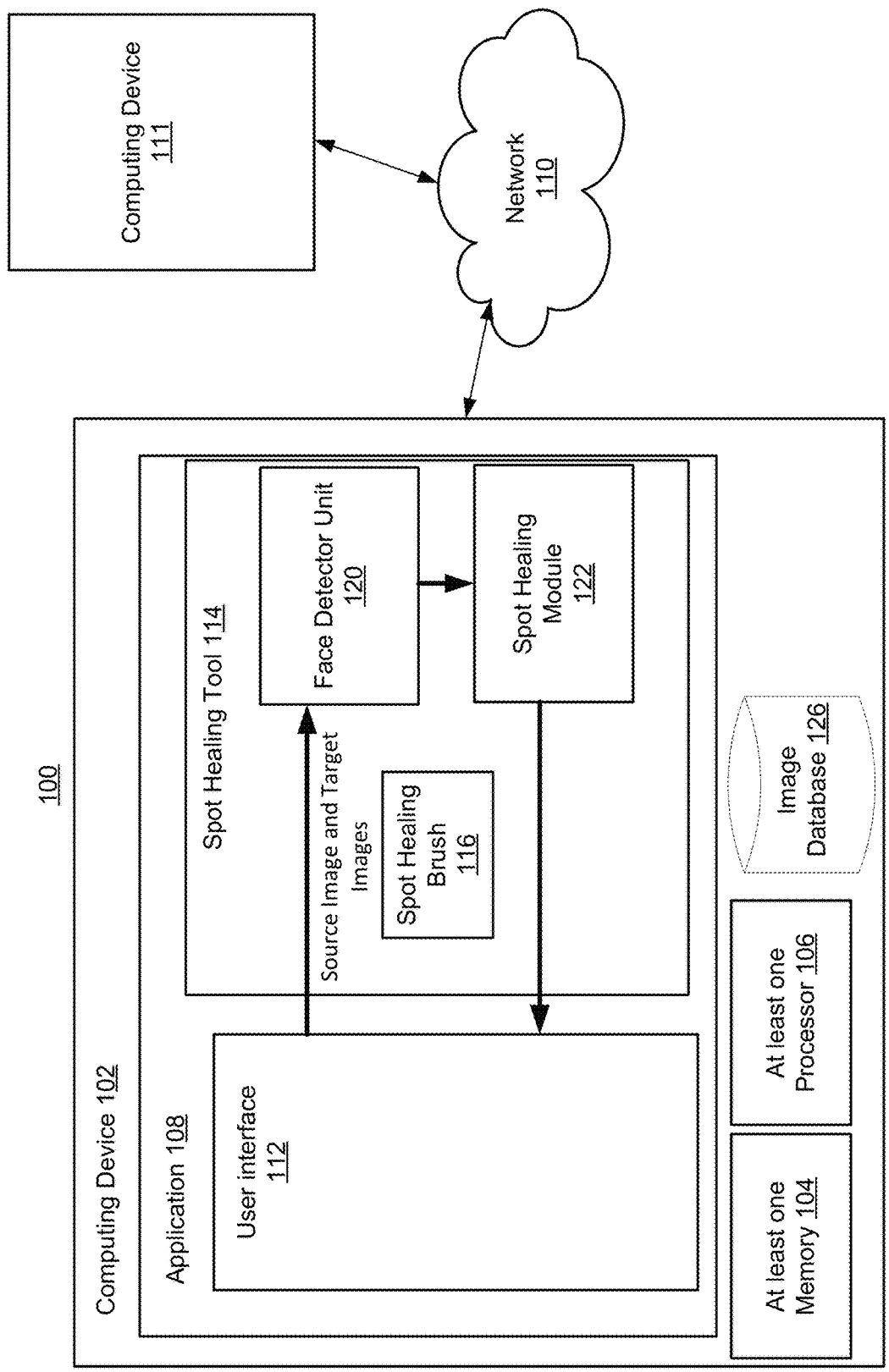
FIG. 1 is a block diagram of a system for the propagation of spot healing edits.

This document describes a system and techniques for propagating spot healing edits from a source image to one or more target images. The system and techniques provide a technical solution to the technical challenges described above, namely how to propagate a spot healing edit on an object in an image to the same object in one or more other images. The system and techniques described in this document use the information for spot healing already applied in a given source image to accurately determine the equivalent spot healing parameters for a set of target images on which similar spot healing fixes are to be applied. The technical solution accurately maps the source and target regions of the healing patches from the source image to the one or more target images.

In general, spot healing involves copying image properties from one location in an object and applying those properties to another location in the same object. For instance, if the object is a face then properties from one location of the face, also referred to as a source patch, may be copied and applied to another location on the face, also referred to as a target patch, to correct a perceived imperfection in the object, such as a blemish, a mark, a spot, or other imperfection that the user desires to correct. For example, the color values (e.g., Red-Green-Blue-Alpha (RGBA) color values) of the source patch are copied and applied to the target patch.

As discussed above, it is challenging to apply the spot healing edits made on a face in a source image to the same face in one or more target images in an automated manner. The spot edit information in the image includes the region containing the imperfection, which was healed by the user in the image, and may be referred to as a target patch. The spot edit information also includes the region from which the content was cloned or copied by the user to fix the imperfection, and may be referred to as a source patch. Together the source patch and the target patch are called the healing region. Given an input image and one or more target images, along with the healing information from the source image, the technical solution identifies the equivalent source patch and target patch in the target image in order to apply the exact same spot healing edits in the target image as was applied in the source image.

When the object to which the spot healing is applied is a face, the technical solution uses facial features for finding the pixel correspondence between the source and target images. In this manner, the spot healing applied in the source image may be accurately applied in the target images even under changes in image scale, noise and illumination between the source image and one or more different target images. When the object in the source image is a face, the technical solution also accounts for differences in face directions and facial expressions between the source image and the target images.

In general, the technical solution determines equivalent objects in the source image and the one or more target images. For instance, if the object is a face, then the solution determines the face in the source image and the equivalent face in the one or more target images. The solution detects the face in the source image and identifies the matching face in the target image and calculates facial feature point sets on the source image and the target image. In some implementations, a face detector unit uses the histograms of oriented gradients (HOG) features (also referred to interchangeably as descriptors) combined with a pre-trained linear classifier to detect the face boundaries in the source image and the target image. In order to recognize the same face in the target image, a local binary pattern combined with the HOG descriptors is used. In some implementations, a convolutional neural network (CNN) based classification model may be used to detect the face in the source image and then in the target images.

The technical solution then calculates facial feature points in the source image and the target image. For detecting the facial features, in some implementations, an open source library which implements the One Millisecond Face Alignment With An Ensemble Of Regression Trees algorithm is used to estimate the location of x,y coordinates that map to facial structures on the face. The algorithm is used to estimate the face's landmark positions directly from a sparse subset of pixel intensities, achieving super-realtime performance with high quality predictions.

The technical solution then determines the feature point correspondence between the feature points of the source image and the target image. In some implementations, a correspondence is created between the different facial landmarks. For example, the indexes of the facial feature points, for example the x,y coordinates, are used as a correspondence between the feature points in the source image and the target image. In this manner, any feature point in the source image has a corresponding feature point in the target image.

The technical solution then determines region correspondence of the source image with the target image. In this part of the solution, the feature correspondence between the source image and the target image is used to set up a correspondence between the different regions of the source image with the regions of the target image. In some implementations, this is accomplished by performing a Delaunay triangulation on the feature points of the source image and of the corresponding feature points of the target image. In this manner, the healing region, including the source patch and the target patch, of the source image maps to the same region of the target image.

Once the region correspondence between the source image and the target image has been determined, the healing region from the source image is transformed to the target image. For instance, given the triangulations calculated, for every triangle of the source image and the corresponding triangle of the target image an affine transform can be calculated that maps the corner points of the triangle of the source image to the corner points of the corresponding triangle of the target image. Since the interest is mainly in the source patch and the target patch, the triangles that contain the source patch and the target patch, either partially or fully, are identified and then only the affine transforms for those regions are calculated. Then, the bounding rectangle of the healing regions is used and divided into small squares. For every small square region, the affine transform of its enclosing triangle is used to calculate the mapped regions in the target image.

More specifically, the bounding rectangle for a healing region is the smallest rectangle that encloses the complete healing region. The bounding rectangle is divided into small connected squares of n×n pixels (e.g., 4×4 pixels). For each of these small squares, if the square contains any portion of the healing region, that square is transformed from the source image to corresponding square on the target image. The affine transform of the triangle which encloses the square is applied on the square region for finding the corresponding region in the target image.

Technical advantages are realized from the technical solution described above, as well as described below in detail with respect to the figures and corresponding description. The technical solution enables automatic transformation of spot healing edits from an object in one image to the same object in one or more other images in an automated manner. As discussed above, some advantages include being able to transfer spot healing edits to objects (including faces) even when there are differences in face directions and facial expressions across the images. The technical solution is robust and also works if the person has blemishes near the eyes or the nose. Another technical advantage is that results of the automatic spot healing edits look the same across all of the target images in comparison to the source image because the technical solution detects and uses both the source patch and the target patch when propagating the spot healing edits from the source image to the target images.

As used herein, spot healing edits refers to edits made to an object in a source image to remove blemishes and other imperfections. For example, spot healing edits may be made to an object, such as a face, in a photograph to remove blemishes and other imperfections in the photograph. A spot healing edit may use sampled pixels from one part of the object that match the color, texture, lighting, transparency, and shading to the part of the object being healed. The spot healing edit uses a healing region to sample the pixels from one part of the healing region and apply the sampled pixels to another part of the healing region. As used herein, the healing region include a source patch and a target patch. The source patch is the area of the object from which the pixels are selected or automatically sampled to be applied to the target patch. In some implementations, the color values (e.g., RGBA color values) are copied from the source patch and applied to the target patch. The source patch may be different shapes and sizes. The target patch may be different shapes and sizes.

As used herein, a source image refers to an image that includes at least one object to which spot healing edits have been made. The source image may be a photograph, where the photograph may be in one of many different formats. The source image may include multiple objects to which spot healing edits have been made. The object to which the spot healing is applied may be any type of object. In some implementations, the object is a face. The face is merely one example used throughout this document, but it is understood that the object may include objects other than a face.

As used herein, a target image refers to an image that includes at least one object to which spot healing edits are desired to be transferred to using the spot healing edits to the same object in the source image. The target image may be a photograph, where the photograph may be in one of many different formats.

FIG. 1 is a block diagram of a system 100 for the propagation of spot healing edits. The system 100 automatically propagates spot healing edits of an object from a source image to the same object in one or more target images. The system 100 uses the information for spot healing already applied in a given source image to accurately determine the equivalent spot healing parameters for a set of target images on which similar spot healing fixes are to be applied. The system 100 accurately maps the source and target regions of the healing patches from the source image to the one or more target images.

Spot healing edits refers to edits made to an object in a source image to remove blemishes and other imperfections. For example, spot healing edits may be made to an object, such as a face, in a photograph to remove blemishes and other imperfections in the photograph. A spot healing edit may use sampled pixels from one part of the object that match the color, texture, lighting, transparency, and shading to the part of the object being healed. The spot healing edit uses a healing region to sample the pixels from one part of the healing region and apply the sampled pixels to another part of the healing region. The healing region include a source patch and a target patch. The source patch is the area of the object from which the pixels are selected or automatically sampled to be applied to the target patch. In some implementations, the color values (e.g., RGBA color values) are copied from the source patch and applied to the target patch. The source patch may be different shapes and sizes. The target patch may be different shapes and sizes. In some implementations, the system 100 automatically propagates spot healing edits of a face in a source image to the same face in one or more target images.

The system 100 includes a computing device 102 having at least one memory 104, at least one processor 106 and at least one application 108. The computing device 102 may communicate with one or more other computing devices over a network 110. For instance, the computing device 102 may communicate with a computing device 111 over the network 110. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network.

The at least one processor 106 may represent two or more processors on the computing device 102 executing in parallel and utilizing corresponding instructions stored using the at least one memory 104. The at least one processor 106 may include a graphics processing unit (GPU) and/or a central processing unit (CPU). The at least one memory 104 represents a non-transitory computer-readable storage medium. Of course, similarly, the at least one memory 104 may represent one or more different types of memory utilized by the computing device 102. In addition to storing instructions, which allow the at least one processor 106 to implement the application 108 and its various components, the at least one memory 104 may be used to store data, such as one or more of the images generated by the application 108 and its components used by the application 108.

The network 110 may be implemented as the Internet, but may assume other different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application 108 may be accessed directly by a user of the computing device 102. In other implementations, the application 108 may be running on the computing device 102 as a component of a cloud network, where a user accesses the application 108 from another computing device over a network, such as the network 110. In one implementation, the application 108 may be a design application. The design application may include features that allow users to enhance, organize, and share images such as photographs, including image editing features. The design application may be a standalone application that runs on the computing device 102. Alternatively, the design application may be an application that runs in another application such as a browser application.

As discussed above, the application 108 may be a design application that includes many features and dozens of tools to edit images such as photographs (or photos). The application 108 includes a user interface 112, which includes an area to enable the user to manipulate and edit the images. One of the many tools of the application 108 includes a spot healing tool 114. The application 108 and the spot healing tool 114 may implement the process 200 of FIG. 2, as discussed below, and the process 300 of FIG. 3 for automatic propagation of spot healing edits from a source image to one or more target images. The spot healing tool 114 takes as input a source image and one or more target images.

The application 108 includes a user interface 112 also referred to interchangeably as a GUI 112. The spot healing tool 14 includes a face detector unit 120 and a spot healing module 122. The user interface 112 is the front facing interface with the application 108 that enables the user to manipulate and edit images including using the spot healing tool 114. The spot healing tool 114 may be initiated from the user interface 112. The user interface 112 is the area of the application 108 where the user can select a source image and one or more target images as part of the input to the spot healing tool 114.

The source image and the target images may be input into the application 108 by various different manners. For example, the images may be directly uploaded from an image capture device such as a camera or a smart phone having a camera. The images also may be selected from a database of images such as image database 126. Still, in other examples, the images may be selected from a different computing device such as computing device 111 through the network 110. The source image includes an object (e.g., a face) on which the user has performed spot healing edits in a healing region of the object. The healing region includes both a source patch and a target patch. The target images include the same object (e.g., the same face) as in the source image to which the user desire to automatically apply the same spot healing edits from the source image to the target images without any user intervention or manual manipulation of the target images to transfer the spot healing edits from the source image to the target images.

Once selected through the user interface 112, the source image and the target images are received by the face detector unit 120. The source image and the target images may be processed serially by the face detector unit 120. In some implementations, the source image and the target images may be processed in parallel by the face detector unit 120.

Figure 4:
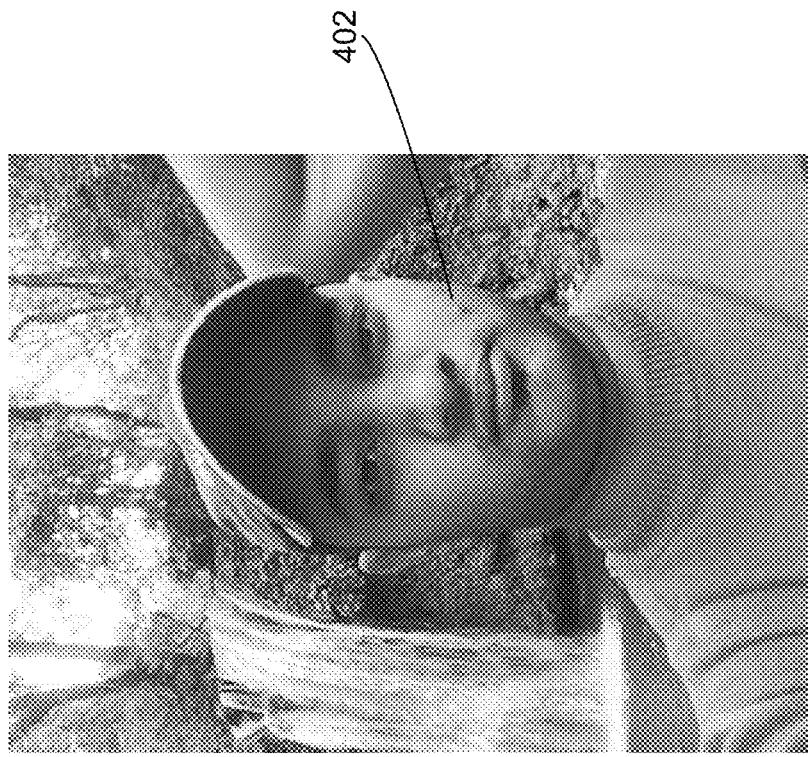
FIG. 4 is an example image of a source image.

Referring also to FIG. 4, an example source image 400 is illustrated. A source image 400 refers to an image that includes at least one object to which spot healing edits have been made. The source image 400 may be a photograph, where the photograph may be in one of many different formats. The source image 400 may include multiple objects to which spot healing edits have been made. The object to which the spot healing is applied may be any type of object. In some implementations, the object is a face. The face is merely one example used throughout this document, but it is understood that the object may include objects other than a face.

In the source image 400, a spot 402 is present on the source image 400 that is desired to correct. First, the spot healing tool 114 may include a spot healing brush 116 that is used to change the imperfection. The spot healing brush 116 uses a healing source (also referred to as a source patch) to copy the properties of the image from the healing source and to paste the healing source properties over the imperfection (also referred to as a healing target or target patch). The spot healing brush 116 may use sampled pixels from one part of the object that match the color, texture, lighting, transparency, and shading to the part of the object being healed. The spot healing brush 116 uses a healing region to sample (either manually selected sample or an automated sample) the pixels from one part of the healing region and apply the sampled pixels to another part of the healing region.

Figure 5:
FIG. 5 is an example image of the source image of FIG. 4 as spot healed using a spot healing brush.

Referring also to FIG. 5, an example source image 500 is illustrated. The source image 500 is the same image as the source image 400 of FIG. 4, except that a spot healing brush has been used to spot heal the imperfection 402 of FIG. 4. For example, the spot healing brush 116 of FIG. 1 uses the image properties from a source patch 510 (also called the healing source) and copies those image properties from the source patch 510 to the target patch 502 (also call the healing target). The source patch 510 and the target patch 502 together may be referred to as a healing region. The spot healing brush 116 enables a user to select a location and a size and shape of the location to copy pixels from a source patch to a target patch. The copied pixels may be pasted to multiple locations on the image, if desired. The target patch 502 is the same area as the spot 402 of FIG. 4 that has been spot healed so that the imperfection is no longer visible. The pixels copied from the source patch 510 are pasted over the target patch 502. The color values (e.g., RGBA color values) of the source patch 510 are copied over the target patch 502.

Figure 6:
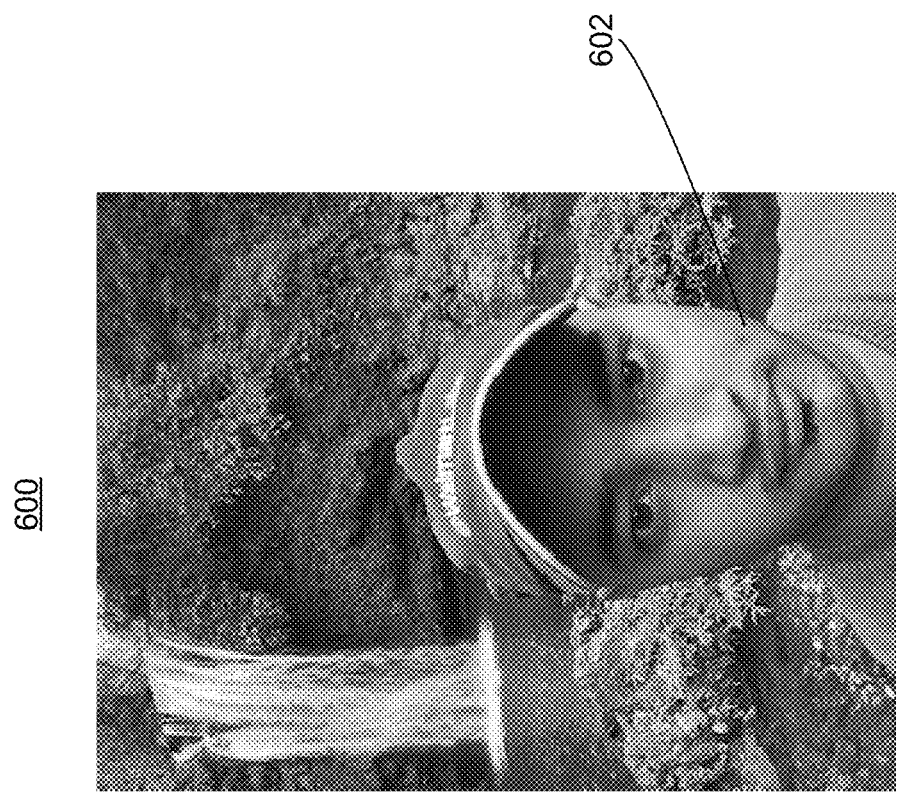
FIG. 6 is an example image of a target image.

Referring to FIG. 6, a target image 600 is illustrated. A target image 600 refers to an image that includes at least one object to which spot healing edits are desired to be transferred to using the spot healing edits to the same object in the source image. The target image may be a photograph, where the photograph may be in one of many different formats.

The target image 600 includes the same object (i.e., the same face) as in the source image 400 of FIG. 4 and 500 of FIG. 5. In the target image 600, the face in the target image 600 is at a different position in the image compared to the same face in the source image 500. The face is also at a different angle and tilt. The user desires to apply the same spot healing edits from the source image 500 of FIG. 5 to the target image 600 of FIG. 6.

Referring back to FIG. 1, the spot healing tool 114 is used to propagate automatically the spot healing edits made by the spot healing brush 116 to the source image 500 to the target image 600. In this example, the source image 500 and the target image 600 are input into the face detector unit 120. The face detector unit 120 receives the source image 500 and the target image 600.

The face detector unit 120 is configured to detect the object that was fixed in the source image and identify the matching object in the target image. In this example, the face detector unit 120 is configured to detect the face in the source image 500 and identify the matching face in the target image 600. The source image 500 includes a source patch 510 and a target patch 502. The face detector unit 120 also calculates facial feature point sets in both the source image and the target image, as discussed in more detail below. In some implementations, the face detector unit 120 is configured to detect multiple different objects that were fixed in a source image and identify matching objects in the target image.

Additionally, the face detector unit 120 is configured to detect the one or more objects that were spot edited in the source image and identify the matching objects in multiple target images. For instance, multiple photographs may be taken of the same person or same group of people, where the group of people may or may not have the same individuals in each photograph. The user may make spot healing edits to one of the photographs and use that photograph as the source image. The face detector unit 120 is used to detect the faces in the photograph used as the source image, and to which the spot healing edits were applied, and to detect the same faces in the remaining photographs so that the spot healing edits can be propagated to all of the other photographs.

In some implementations, the face detector unit 120 detects the object (e.g., the face) using the histograms of oriented gradients (HOG) features (or descriptors) combined with a pre-trained linear classifier to detect the face boundaries in both the source image and the target image. HOG is a feature descriptor used to represent an image. The HOG descriptor technique counts occurrences of gradient orientation is localized portions of the image. Then, a support vector machine (SVM) classifier is trained with using a dataset containing HOG descriptors for a large number of positive and negative examples. An SVM is a discriminative classifier formally defined by a separating hyperplane. In other words, given labeled training data, the SVM outputs an optimal hyperplane which categorizes new examples. In two dimensional space, this hyperplane is a line dividing a plane in two parts where in each class lay in either side. Then, the trained model is deployed as part of the face detector unit 120 and the trained model is used to detect faces in any given input image.

In some implementations, a convolutional neural network (CNN) based classification model may be used to detect objects in the images, such as detecting the faces in the images. The CNN may be trained to detect faces and the trained CNN model may be deployed as part of the face detector unit 120.

Once the faces have been detected in the source image and the target image, the face detector unit 120 detects the facial feature points in the source image and detects the facial feature points in the target image. In some implementations, the face detector unit 120 may use the One Millisecond Face Alignment with an Ensemble of Regression Trees algorithm (referred to herein as the One Millisecond Face Alignment algorithm) to estimate the location of multiple (e.g., 68) (x,y) coordinates that map to the facial structures on the face. An open source library which implements the One Millisecond Face Alignment algorithm is used to estimate the location of x,y coordinates that map to facial structures on the face. The algorithm is used to estimate the face's landmark positions directly from a sparse subset of pixel intensities, achieving super-realtime performance with high quality predictions. The One Millisecond Face Alignment algorithm detects the main facial landmarks, including the face outline, the mouth, the nose and the eyes. The facial landmarks are marked with coordinates so that each facial feature is uniquely marked and the position of each facial landmarked is known and can be later mapped or compared against the same face in a different image.

The One Millisecond Face Alignment algorithm performs face alignment in milliseconds and realizes superior speed and accuracy by identifying essential components of prior face alignment algorithms and then incorporating them in a streamlined formulation into a cascade of high capacity regression functions learnt via gradient boosting. Face alignment is solved with a cascade of regression functions. Each regression function in the cascade efficiently estimates the shape from an initial estimate and the intensities of a sparse set of pixels indexed relative to this initial estimate. In some implementations, other algorithms can be used to determine the facial landmark positions.

The facial feature points and the determined coordinates may be stored in an index for comparison by the spot healing module 122. The index may be designated by a key or number and the index may reference an x,y coordinate for the point on the image. The x,y coordinate position may be provided in relation to the overall image.

Figure 7B:
FIG. 7B is an example of detecting the face in the target image of FIG. 6 including the facial feature points.
Figure 7A:
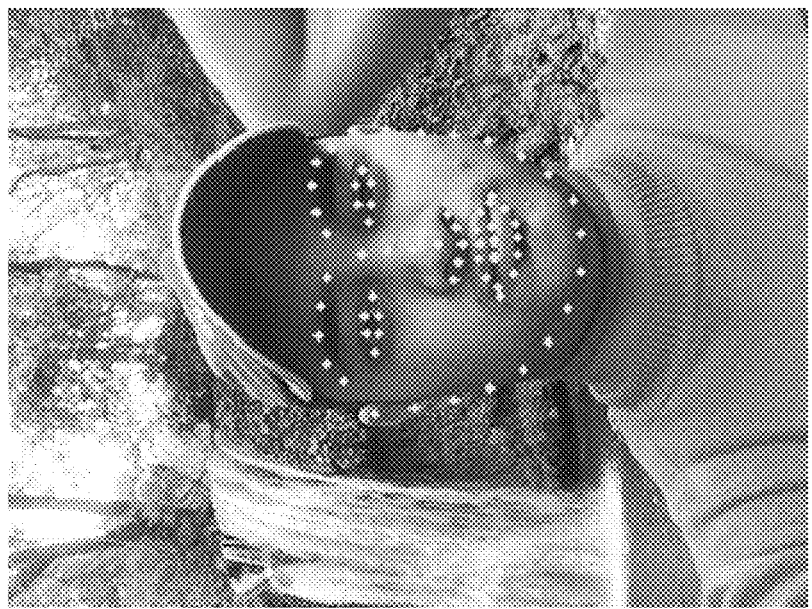
FIG. 7A is an example of detecting the face in the source image of FIG. 5 including the facial feature points.

Referring to FIGS. 7A and 7B, the source image 500 is depicted in FIG. 7A with the facial features mapped using the One Millisecond Face Alignment algorithm. The target image 600 is depicted in FIG. 7B with the facial features mapped using the One Millisecond Face Alignment algorithm. As seen in both FIGS. 7A and 7B, the main facial landmarks are marked with coordinates surrounding each facial feature. Each coordinate may be marked as an x,y coordinate relative to the image. In this manner, each of the main facial features, such as the eyes, eyebrows, nose, mouth, and face outline, are marked and/or identified with specific coordinates marking their exact location in the image.

Referring back to FIG. 1, once the facial features are detected and the coordinates are determined for the facial features, the spot healing module 122 determines the facial feature correspondence between the facial feature points of the source image and the facial feature points of the target image. The indexes of the facial feature points calculated for the source image and the target image are used as a correspondence between the feature points in the source image and the target image. In some implementations, the source image and the target image each include the same number of facial feature points. Each facial feature point is indexed, as discussed above, by a number and a coordinate location on the image. In this manner, point 1 on the source image has a coordinate location on the source image and corresponds to point 1 on the target image, which may have a different coordinate location on the target image. The mapping continues for all corresponding points, which in some implementations may include up to and including 68 points.

Figure 8:
FIG. 8 is an example of the indexes of the facial feature points.

Referring also to FIG. 8, the indexes of the facial feature points are visualized for the source image 800. As discussed above, each facial feature point in source image corresponds to a facial feature point in the target image. For instance, point 1 has a specific x,y coordinate and would correspond to point 1 in the target image, which may have a different x,y coordinate in that image because the face may have changed in some way (e.g., orientation, facial expression, etc.) from the source image. Similarly, points 2 through 68 also have specific x,y coordinates and map to points 2 through 68 in the target image, which have x,y coordinates marking the points in the target image.

Once the spot healing module 122 determines the facial feature correspondence, the spot healing module 122 determines region correspondence between regions of the source image and regions of the target image using the facial feature point correspondence. In some implementations, for example, a Delaunay triangulation is performed on the facial feature points of the source image and a Delaunay triangulation is performed on the facial feature points of the target image. Delaunay triangulation for a given set P of discrete points in a plan is a triangulation DT(P) such that no point in P is inside the circumcircle of any triangle in DT(P). Delaunay triangulations maximize the minimum angle of all the angles of the triangles in the triangulation. Said another way, a Delaunay triangulation of a vertex set is a triangulation of the vertex set with the property that no vertex in the vertex set falls in the interior of the circumcircle (i.e., the circle that passes through all three vertices) of any triangle in the triangulation.

Figure 9B:
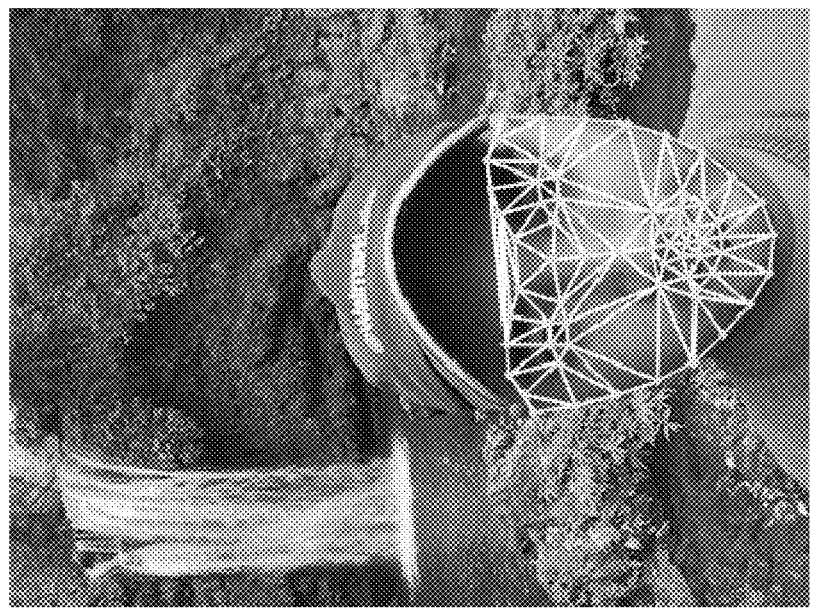
FIG. 9B is an example of Delaunay triangulation of feature points in the target image of FIG. 6.
Figure 9A:
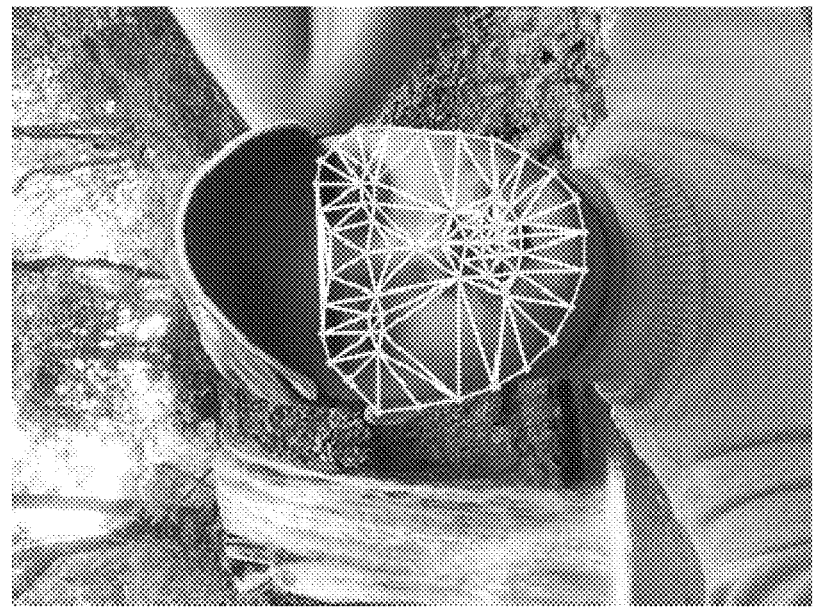
FIG. 9A is an example of Delaunay triangulation of feature points in the source image of FIG. 5.

Referring to FIGS. 9A and 9B, the Delaunay triangulation of the facial feature points of the source image 500 is illustrated in FIG. 9A and the Delaunay triangulation of the facial feature points of the target image 600 is illustrated in FIG. 9B. In this manner, the healing region on the source image is able to be mapped to the same region on the target image. The Delaunay triangulation uses the x,y coordinates to form vertex sets and to calculate the Delaunay triangulation.

One the region correspondence has been determined, the spot healing module 122 transforms the healing region of the face in the source image to a corresponding region of the face in the target image using the region correspondence. The spot healing module 122 transforms both the source patch and the target patch from the source image to the target image.

In some implementations, for every triangle of the source image and the corresponding triangle of the target image, the affine transform may be calculated that maps the corners points of the triangle of the source image to the corners points of the corresponding triangle of the target image. An affine transform is a linear mapping that preserves points, straight lines and planes. Sets of parallel lines remain parallel after an affine transformation. An affine transform technique may be used to correct for geometric distortions or deformations that occur with non-ideal camera angles. Any triangle can be transformed into any other by an affine transformation.

Instead of calculating the affine transforms for all triangles, the affine transforms may be calculated for the triangles that either partially or fully contain the source patch and the target patch. From the affine transforms, the bounding rectangle of the healing regions are taken and divided into smaller squares (e.g., 4×4). For every small square region, the affine transform of its enclosing triangle is used to calculate the mapped regions in the target image.

More specifically, the bounding rectangle for a healing region is the smallest rectangle that encloses the complete healing region. The bounding rectangle is divided into small connected squares of n×n pixels (e.g., 4×4 pixels). For each of these small squares, if the square contains any portion of the healing region, that square is transformed from the source image to corresponding square on the target image. The affine transform of the triangle which encloses the square is applied on the square region for finding the corresponding region in the target image.

Figure 10:
FIG. 10 is an example of the spot healing propagation applied to the target image of FIG. 6.

Referring to FIG. 10, the target image 600 is illustrated after the spot healing edits have been transformed from the source image to the target image. One technical advantage of the system 100 and the application 108 having the spot healing tool 114 is that a spot healing edit made to a face in one image may be propagated to the same face in hundreds or more images in a fully automated manner. What was once a manually intensive process now may be completed in a much faster time across many multiple images. The technical advantage is realized even more in a source image having multiple faces where spot edits are made to multiple faces. Those spot edits to the multiple faces may be made to the same faces in multiple target images in a fully automated manner.

Figure 2:
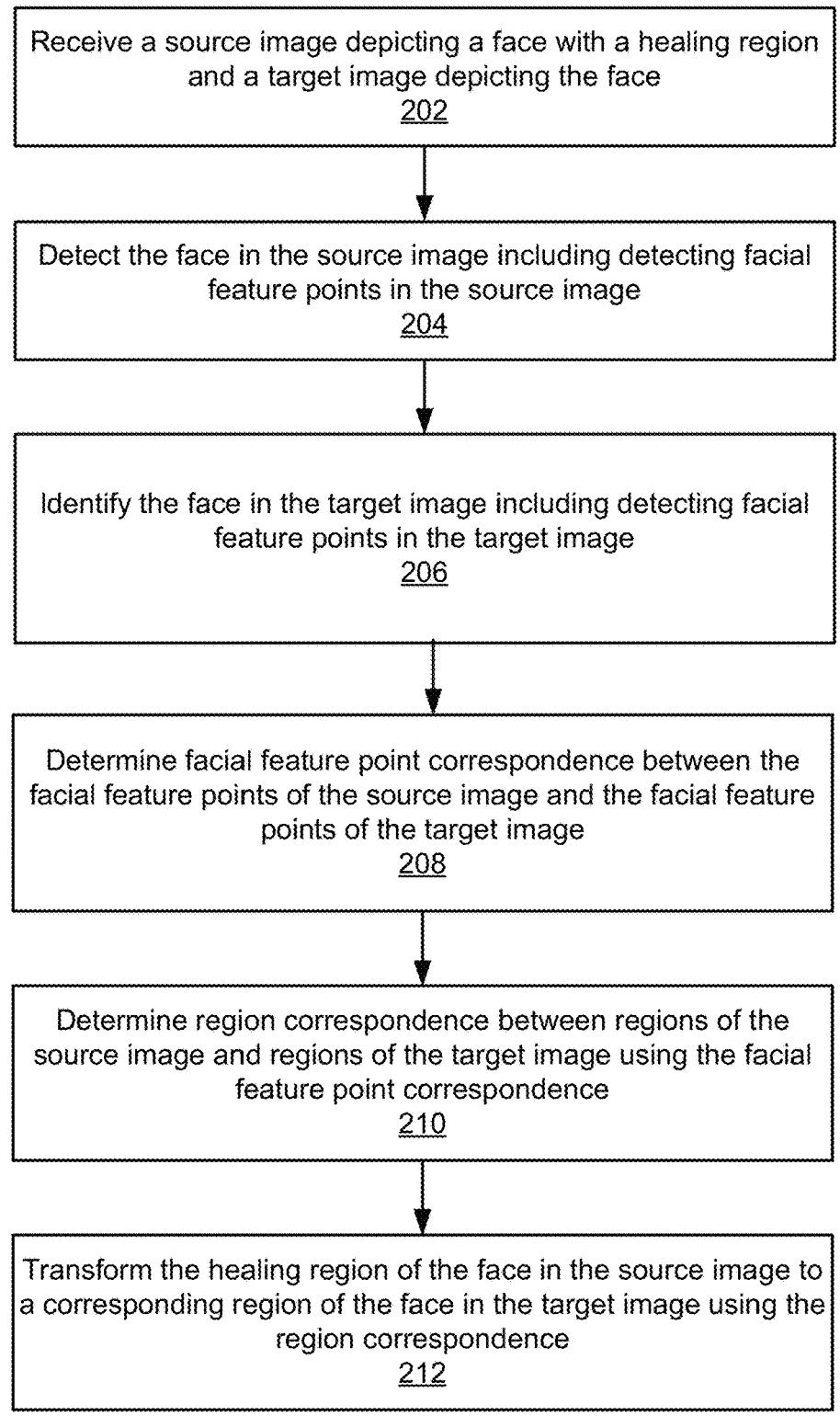
FIG. 2 is a flowchart illustrating example operations of the system of FIG. 1.

Referring to FIG. 2, an example process 200 illustrates example operations of the system 100 of FIG. 1. Process 200 is an example of a computer-implemented method for propagating spot healing edits from a source image to a target image. Instructions for the performance of process 200 may be stored in the at least one memory 104 and executed by the at least one processor 106 on the computing device 102.

Process 200 receiving a source image depicting a face with a healing region and a target image depicting the face (202). For example, with respect to FIG. 1, the spot healing tool 114, which is part of the application 108, may receive the source image depicting the face with the healing region and the target image depicting the face through the user interface 112. More specifically, the face detector unit 120 may receive the source image and the target image. The healing region includes both a source patch and a target patch.

Process 200 includes detecting the face in the source image including detecting facial feature points in the source image (204). For example, the face detector unit 120 is configured to detect the face in the source image including detecting facial feature points in the source image. For example, the face detector unit 120 may use a histograms of oriented gradients features combined with a pre-trained linear classifier to detect facial boundaries in the source image. Additionally, the face detector unit may detect the facial feature points in the source image by estimating a location of multiple coordinates that map to facial structures on the face in the source image.

Process 200 includes identifying the face in the target image including detecting facial feature points in the target image (206). For example, the face detector unit 120 is configured to identify the face in the target image including detecting facial feature points in the target image. The face detector unit 120 may identify the face in the target image by using a local binary pattern combine with the histograms of oriented gradients features to detect facial boundaries of the face in the target image. The face detector unit 120 may detect the facial feature points in the target image by estimating a location of multiple coordinates that map to facial structures on the face in the target image.

Process 200 includes determining facial feature point correspondence between the facial feature points of the source image and the facial feature points of the target image (208). For example, the spot healing module 122 is configured to determine facial feature point correspondence between the facial feature points of the source image in the facial feature points of the target image. For example, the spot healing module may create a correspondence between the different facial landmarks. Indexes of the facial feature points that were previously calculated are used as a correspondence between the feature points in the source image and the target image.

Process 200 includes determining region correspondence between regions of the source image and regions of the target image using the facial feature point correspondence (210). For example, the spot healing module 122 is configured to determine region correspondence between regions of the source image and regions of the target image using the facial feature point correspondence. In some implementations, the spot healing module 122 determines the region correspondence by performing a Delaunay triangulation on the facial feature points of the source image to generate a set of triangles in the source image. The spot healing module 122 also performs the Delaunay triangulation on the facial feature points of the target image to generate a set of triangles in the target image.

Process 200 includes transforming the healing region of the face in the source image to a corresponding region of the face in the target image using the region correspondence (212). For example, the spot healing module 122 is configured to transform the healing region of the face in the source image to the corresponding region of the face in the target image using the region correspondence. In some implementations, transforming the healing region of the face in the source image to the corresponding region of the face in the target image includes identifying one or more triangles from the set of triangles in the source image that contain the healing region and calculating affine transforms for the triangles that contain the healing regions. A bounding rectangle for the healing region is determined and multiple small square regions are generated from the bounding rectangle. For each of the multiple small square regions, the healing region is mapped to the target image using the a fine transform of the triangle in which the small square region is enclosed.

Figure 3:
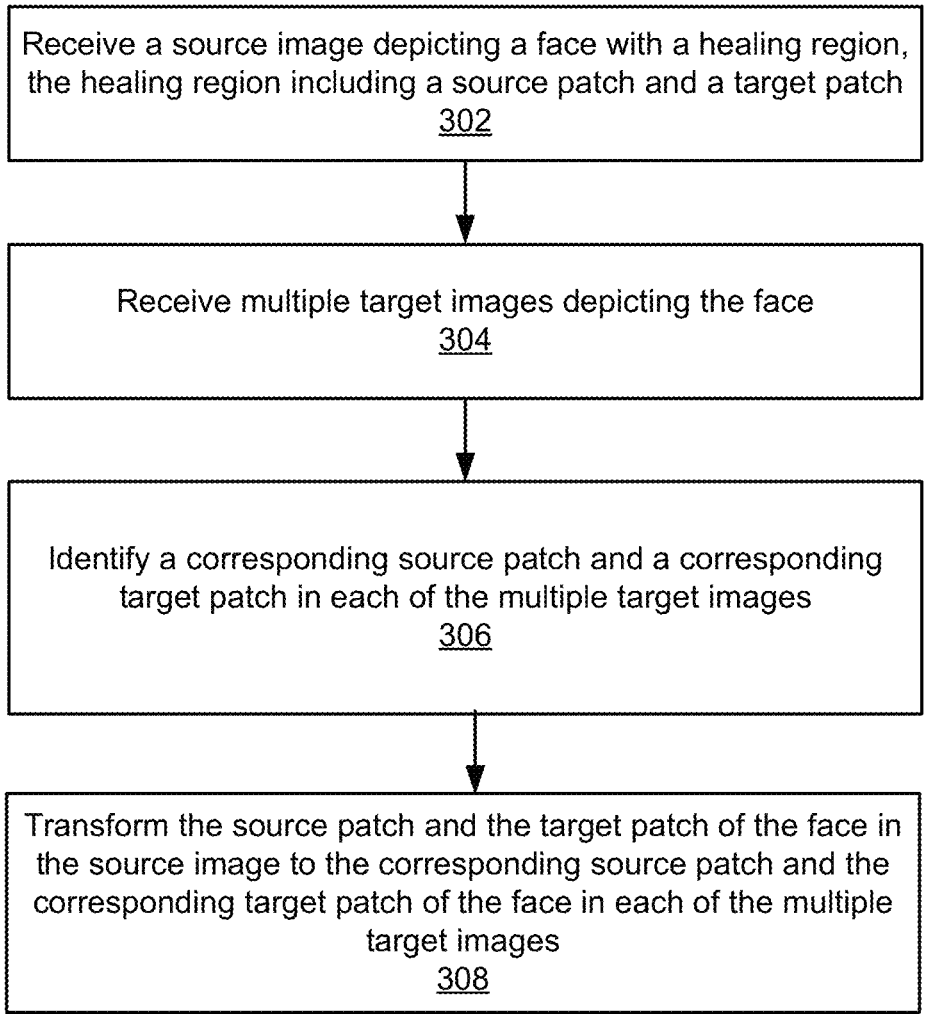
FIG. 3 is a flowchart illustrating example operations of the system of FIG. 1.

Referring to FIG. 3, an example process 300 illustrates example operations of the system 100 of FIG. 1. Process 300 is an example of a computer-implemented method for propagating spot healing edits from a source image to multiple target images. Instructions for the performance of process 300 may be stored in the at least one memory 104 and executed by the at least one processor 106 on the computing device 102.

Process 300 includes receiving a source image depicting a face with a healing region, where the healing region includes a source patch and a target patch (302). For example, with respect to FIG. 1, the spot healing tool 114, which is part of the application 108, may receive the source image depicting the face with the healing region through the user interface 112, where the healing region includes both a source patch and a target patch.

Process 300 includes receiving multiple target images depicting the face (304). For example, the spot healing tool 114 may receive multiple target images depicting the face through the user interface 112. The spot healing tool 114 a receive the source image and the multiple target images in different ways as discussed above, including from the image database 126.

Process 300 includes identifying a corresponding source patch and a corresponding target patch in each of the multiple target images (306). For example, the spot healing tool 114 may identify a corresponding source patch and a corresponding target patch in each of the multiple target images.

Process 300 includes transforming the source patch and the target patch of the face in the source image to the corresponding source patch and the corresponding target patch of the face in each of the multiple target images (308). For example, the spot healing tool 114 transforms the source patch and the target patch of the face in the source image to the corresponding source patch and the corresponding target patch of the face in each of the multiple target images. More specifically, the transformation enables the color values from the source patch of the face in the target image to be copied to the target patch of the face in the target image.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for propagating spot healing edits from a source image to a target image, the method comprising:
    receiving a source image depicting a face with a healing region, wherein the healing region includes a source patch and a target patch, the target patch comprising a region where a spot edit to the source image was made based on the source patch;
    receiving a target image depicting the face;
    detecting the face in the source image including detecting facial feature points in the source image;
    identifying the face in the target image including detecting facial feature points in the target image;
    determining facial feature point correspondence between the facial feature points of the source image and the facial feature points of the target image;
    determining region correspondence between regions of the source image and regions of the target image using the facial feature point correspondence; and
    transforming the healing region of the face in the source image to a corresponding region of the face in the target image using the region correspondence.

2. The computer-implemented method as in claim 1, wherein:
    detecting the face in the source image comprises using a face detector unit including a histograms of oriented gradients features combined with a pre-trained linear classifier to detect facial boundaries in the source image; and
    detecting the facial feature points in the source image comprises estimating a location of multiple coordinates that map to facial structures on the face in the source image.

3. The computer-implemented method as in claim 2, wherein:
    identifying the face in the target image comprises using a local binary pattern combined with the histograms of oriented gradients features to detect facial boundaries of the face in the target image; and
    detecting the facial feature points in the target image comprises estimating a location of multiple coordinates that map to facial structures on the face in the target image.

4. The computer-implemented method as in claim 3, wherein determining the region correspondence comprises:
    performing a Delaunay triangulation on the facial feature points of the source image to generate a set of triangles in the source image; and
    performing the Delaunay triangulation on the facial feature points of the target image to generate a set of triangles in the target image.

5. The computer-implemented method as in claim 4, wherein transforming the healing region of the face in the source image to a corresponding region of the face in the target image comprises:
    identifying one or more triangles from the set of triangles in the source image that contain the healing region;
    calculating affine transforms for the triangles that contain the healing regions;
    determining a bounding rectangle for the healing region and generating multiple small square regions from the bounding rectangle; and
    for each of the multiple small square regions, mapping the healing region to the target image using the affine transform of the triangle in which the small square region is enclosed.

6. The computer-implemented method as in claim 1, wherein the face in the target image is tilted at an angle relative to the face in the source image.

7. A computer program product for propagating spot healing edits from a source image to multiple target images, the computer program product being tangibly embodied on a non-transitory computer-readable storage medium and comprising
    instructions that, when executed by at least one computing device, are configured to cause the at least one computing device to:
    receive a source image depicting a face with a healing region, the healing region including a source patch and a target patch, the target patch comprising a region where a spot edit to the source image was made based on the source patch;
    receive multiple target images depicting the face;
    identify a corresponding source patch and a corresponding target patch in each of the multiple target images; and
    transform the source patch and the target patch of the face in the source image to the corresponding source patch and the corresponding target patch of the face in each of the multiple target images.

8. The computer program product of claim 7, further comprising instructions that, when executed, cause the at least one computing device to:
    detect the face in the source image including detecting facial feature points in the source image; and
    identify the face in the multiple target images including detecting facial feature points in the multiple target images.

9. The computer program product of claim 8, wherein the instructions that, when executed, cause the at least one computing device to detect the face in the source image and identify the face in the multiple target images comprise instructions that, when executed, cause the at least one computing device to:
  detect the face in the source image using a face detector unit including a histograms of oriented gradients features combined with a pre-trained linear classifier to detect facial boundaries in the source image; and
  use a local binary pattern combined with the histograms of oriented gradients features to detect facial boundaries of the face in the multiple target images.

10. The computer program product of claim 8, further comprising instructions that, when executed, cause the at least one computing device to determine facial feature point correspondence between the facial feature points of the source image and the facial feature points in the multiple target images.

11. The computer program product of claim 10, further comprising instructions that, when executed, cause the at least one computing device to determine region correspondence between regions of the source image and regions of the multiple target images by:
  performing a Delaunay triangulation on the facial feature points of the source image to generate a set of triangles in the source image; and
  performing a Delaunay triangulation on the facial feature points of the multiple target images to generate a set of triangles in the multiple target images.

12. The computer program product of claim 11, wherein the instructions that, when executed, cause the at least one computing device to transform the source patch and the target patch comprise instructions that, when executed, cause the at least one computing device to:
  identify one or more triangles from the set of triangles in the source image that contain the source patch and the target patch;
  calculate affine transforms for the triangles that contain the source patch and the target patch;
  determine a bounding rectangle for the source patch and a bounding rectangle for the target patch and generate multiple small square regions from the bounding rectangle for the source patch and the target patch; and
  for each of the small square regions, map the source patch and the target patch to the multiple target images using the affine transforms of the triangles in which the small square regions are enclosed.

13. A system for propagating spot healing edits from a source image to multiple target images, the system comprising:
  at least one memory including instructions; and
  at least one processor that is operably coupled to the at least one memory and that is arranged and configured to execute instructions that, when executed, because the at least one processor to implement an application, the application comprising:
  a face detector unit that is arranged and configured to:
    receive a source image depicting a face with a healing region, the healing region including a source patch and a target patch, the target patch comprising a region where a spot edit to the source image was made based on the source patch,
    receive multiple target images depicting the face,
    detect the face in the source image including detecting facial feature points in the source image, and
    identify the face in the multiple target images including detecting facial feature points in the multiple target images; and
  a spot healing module that is arranged and configured to:
    identify a corresponding source patch and a corresponding target patch in each of the multiple target images, and
    transform the source patch and the target patch of the face in the source image to the corresponding source patch and the corresponding target patch of the face in each of the multiple target images.

14. The system of claim 13, wherein the face in at least one of the target images is tilted at an angle relative to the face in the source image.

15. The system of claim 13, wherein the face in at least one of the target images is scaled differently relative to the face in the source image.

16. The system of claim 13, wherein the face detector unit is arranged and configured to:
  detect the face in the source image using a histograms of oriented gradients features combined with a pre-trained linear classifier to detect facial boundaries in the source image; and
  use a local binary pattern combined with the histograms of oriented gradients features to detect facial boundaries of the face in the multiple target images.

17. The system of claim 13, wherein the spot healing module is arranged and configured to determine region correspondence between regions of the source image and regions of the multiple target images by:
  performing a Delaunay triangulation on the facial feature points of the source image to generate a set of triangles in the source image; and
  performing a Delaunay triangulation on the facial feature points of the multiple target images to generate a set of triangles in the multiple target images.

18. The system of claim 17, wherein the spot healing module is arranged and configured to:
  identify one or more triangles from the set of triangles in the source image that contain the source patch and the target patch;
  calculate affine transforms for the triangles that contain the source patch and the target patch;
  determine a bounding rectangle for the source patch and a bounding rectangle for the target patch and generate multiple small square regions from the bounding rectangle for the source patch and the target patch; and
  for each of the small square regions, map the source patch and the target patch to the multiple target images using the affine transforms of the triangles in which the small square regions are enclosed.

19. The system of claim 13, wherein the spot healing module is configured to copy color values of the source patch to color values of the target patch of the face in each of the multiple target images.

* * * * *